(12) United States Patent
Park

(10) Patent No.: US 11,926,275 B2
(45) Date of Patent: Mar. 12, 2024

(54) COCKPIT MODULE OF PURPOSE BUILT VEHICLE

(71) Applicant: HYUNDAI MOBIS Co., Ltd., Seoul (KR)

(72) Inventor: Jae Whoan Park, Cheonan-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 17/951,804

(22) Filed: Sep. 23, 2022

(65) Prior Publication Data

US 2023/0129974 A1    Apr. 27, 2023

(30) Foreign Application Priority Data

Oct. 27, 2021 (KR) .................. 10-2021-0144915

(51) Int. Cl.
| | | |
|---|---|---|
| *B60N 3/00* | (2006.01) | |
| *B60R 7/06* | (2006.01) | |
| *B60R 21/045* | (2006.01) | |
| *B62D 1/04* | (2006.01) | |
| *B62D 1/183* | (2006.01) | |
| *B62D 1/185* | (2006.01) | |

(52) U.S. Cl.
CPC ............ *B60R 21/045* (2013.01); *B60N 3/001* (2013.01); *B60R 7/06* (2013.01); *B62D 1/04* (2013.01)

(58) Field of Classification Search
CPC ........ B60N 3/001; B60N 3/002; B60N 3/005; B60R 7/00; B60R 7/04; B60R 7/06; B60R 21/02; B60R 21/04; B60R 21/045; B60R 21/05; B62D 1/04; B62D 1/11; B62D 1/18; B62D 1/183; B62D 1/184; B62D 1/185; B62D 1/19; B62D 1/192; B62D 1/195; B62D 1/197
See application file for complete search history.

(56) References Cited

U.S. PATENT DOCUMENTS

| | | | | |
|---|---|---|---|---|
| 2005/0144770 | A1* | 7/2005 | Sawada | B62D 25/16 29/709 |
| 2014/0110962 | A1* | 4/2014 | Bohnenberger | B60R 7/06 296/37.12 |
| 2017/0113589 | A1* | 4/2017 | Riefe | B62D 1/16 |
| 2019/0241205 | A1* | 8/2019 | Toyama | B60N 2/0244 |
| 2021/0253010 | A1* | 8/2021 | Bauernfeind | B60N 3/002 |
| 2022/0281508 | A1* | 9/2022 | Gangisetty | B60N 3/005 |

FOREIGN PATENT DOCUMENTS

| | | | | | |
|---|---|---|---|---|---|
| DE | 102018123181 | A1 * | 4/2019 | | B60K 37/00 |
| DE | 102018001024 | A1 * | 8/2019 | | |
| DE | 102018212085 | A1 * | 1/2020 | | B60N 3/002 |
| DE | 102020107156 | A1 * | 9/2021 | | B60N 3/005 |
| DE | 202023103941 | U1 * | 8/2023 | | |

(Continued)

*Primary Examiner* — Jason D Shanske
*Assistant Examiner* — Daniel M. Keck
(74) *Attorney, Agent, or Firm* — NSIP Law

(57) ABSTRACT

A cockpit module of a purpose built vehicle includes a crash pad, a steering wheel positioned in the crash pad, and a table, accommodated in the crash pad, including an extension structure configured to insert into and withdraw from the crash pad. A portion of the table extends from the crash pad in a rearward direction.

13 Claims, 10 Drawing Sheets

(56) References Cited

FOREIGN PATENT DOCUMENTS

| EP | 3628565 A1 | * | 4/2020 | ........... B60N 2/0244 |
|----|------------|---|--------|------------------------|
| JP | 2017-102104 A | | 6/2017 | |
| KR | 20020013198 A1 | * | 2/2002 | |
| KR | 100980718 B1 | * | 9/2010 | |
| RU | 2478493 C1 | * | 4/2013 | ............. B60K 37/04 |

* cited by examiner

COCKPIT MODULE OF PURPOSE BUILT VEHICLE

CROSS-REFERENCE TO RELATED APPLICATION

This application claims the benefit under 35 USC 119(a) of Korean Patent Application No. 10-2021-0144915, filed on Oct. 27, 2021 in the Korean Intellectual Property Office, the entire disclosure of which is incorporated herein by reference for all purposes.

BACKGROUND

1. Field

The following description relates to a cockpit module of a purpose built vehicle (PBV).

2. Discussion of Related Art

With general developments of vehicles, cockpit structures in vehicles are diversifying, and various types of cockpit modules are provided according to the purposes of the vehicles.

Although it is good when cockpit modules which can satisfy the needs of riders (including drivers, passengers, and users) are applied according to driving environments or purposes of each situation, since conventional cockpit modules are provided as limited types of general structure, convenience is not always satisfactory.

For example, since a table provided in a conventional cockpit module is installed in and withdrawn from or inserted into a limited layout, there is bound to be a limit of a table space. Accordingly, there is a problem that such conventional tables are almost obsolete.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cockpit module of a purpose built vehicle includes a crash pad, a steering wheel positioned in the crash pad, and a table, accommodated in the crash pad, including an extension structure configured to insert into and withdraw from the crash pad. A portion of the table extends from the crash pad in a rearward direction.

The table may further include a base plate, an upper tray, coupled to the base plate, spaced apart from the base plate, and a lower tray configured to insert into and withdraw from a space between the base plate and the upper tray.

The cockpit module may further include a plurality of rotational links disposed between and connected to the base plate and the upper tray. Each of the rotational links may include an upper hinge shaft disposed at one end portion of a corresponding rotational link in a longitudinal direction and connected to the upper tray, and a lower hinge shaft disposed at another end portion of the corresponding rotational link in the longitudinal direction and connected to the base plate.

The upper tray may include a plurality of guide rails disposed between the rotational links and engaged with the lower tray, and each of the guide rails may include a straight section extending from a front end to a rear point of a corresponding guide rail in a longitudinal direction, and an inclined section extending from the straight section to a rear end portion inclined upward.

The lower tray may include a guide protrusion, disposed on a front end portion of the lower tray, engaged with the guide rail, and movable on the guide rail.

The base plate may include a guide pin, engaged with the lower tray, configured to guide an insertion path and a withdrawal path of the lower tray.

The lower tray may include a piston configured to move on the guide pin.

The portion of the table may extend in the rearward direction from the crash pad when the steering wheel is in the crash pad.

The steering wheel may be built into the crash pad.

In another general aspect, a cockpit module of a purpose built vehicle includes a crash pad having different types of accommodation spaces in predetermined sections, a steering wheel disposed in a type of accommodation space of the accommodation spaces, and a table having an extension structure configured to insert into and withdraw from the crash pad. The table includes a base plate, an upper tray spaced apart from and disposed above the base plate, a lower tray configured to insert into and withdraw from another type of accommodation space between the base plate and the upper tray, and rotational links disposed between and connected to the base plate and the upper tray.

The base plate may include a guide pin, engaged with the lower tray, configured to guide an insertion path and a withdrawal path of the lower tray. The lower tray may include a piston configured to move on the guide pin.

The upper tray may include a plurality of guide rails positioned between the rotational links and engaged with the lower tray. Each of the guide rails may include a straight section extending from a front end to a rear point of a corresponding guide rail in a longitudinal direction, and an inclined section extending from the straight section to a rear end portion inclined upward.

The lower tray may include a guide protrusion, disposed on a front end portion of the lower tray, engaged with the guide rail, and movable on the guide rail.

The lower tray may include a first straight region on which the upper tray is seated when the lower tray extends, an inclined region extending from the first straight region and inclined upward, and an upper end surface forming a second straight region extending from the inclined region along a straight path.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
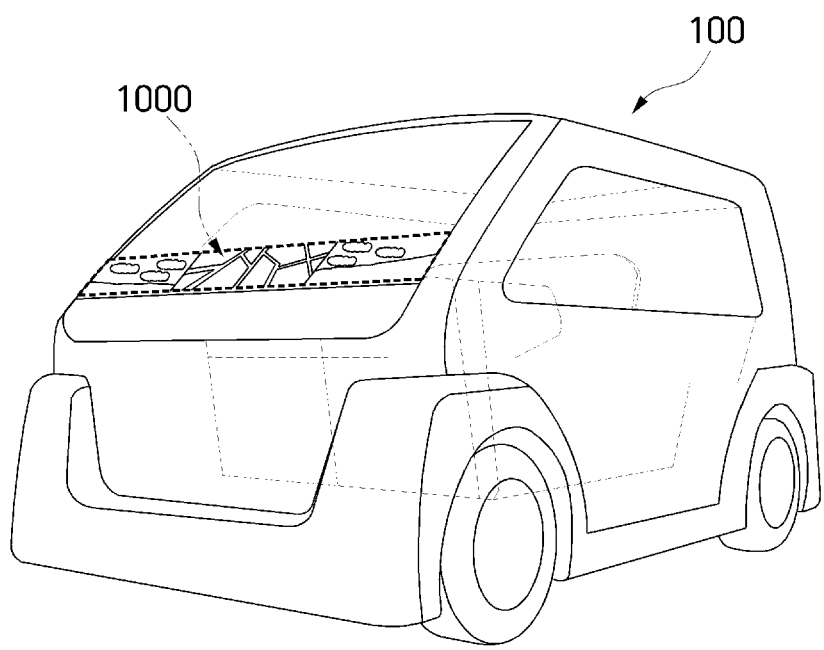
FIG. 1 is a perspective view illustrating a purpose built vehicle in which a cockpit module according to one embodiment is installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following description is directed to providing a cockpit module of a purpose built vehicle capable of extending a table to provide a wider space to a user.

Advantages and features of the following description and methods of achieving the same will be clear with reference to the accompanying drawings and the following detailed embodiments. However, the following description is not limited to the embodiments to be disclosed below but may be implemented in various different forms, the embodiments are provided to fully explain the present invention and fully explain the scope of the following description for those skilled in the art, and the scope of the following description is defined by the appended claims. Meanwhile, the terms used herein are provided to describe embodiments of the following description and not for purposes of limitation. In the specification, unless the context clearly indicates otherwise, the singular forms include the plural forms. The terms "comprise" or "comprising" used in the specification specify some stated components, steps, operations and/or elements but do not preclude the presence or addition of one or more other components, steps, operations and/or elements.

Hereinafter, embodiments of the following description will be descried with reference the accompanying drawings.

FIGS. 1 to 10 are views illustrating a cockpit module of a purpose built vehicle according to one embodiment is installed.

Referring to FIG. 1, a purpose built vehicle 100 is evaluated as a vehicle of the future because the vehicle can be driven for different purposes according to its design, and the vehicle provides an autonomous driving environment.

According to the development of the technology, the purpose built vehicle 100 has a structural advantage of selecting convenience functions in addition to a driving function.

Figure 2:
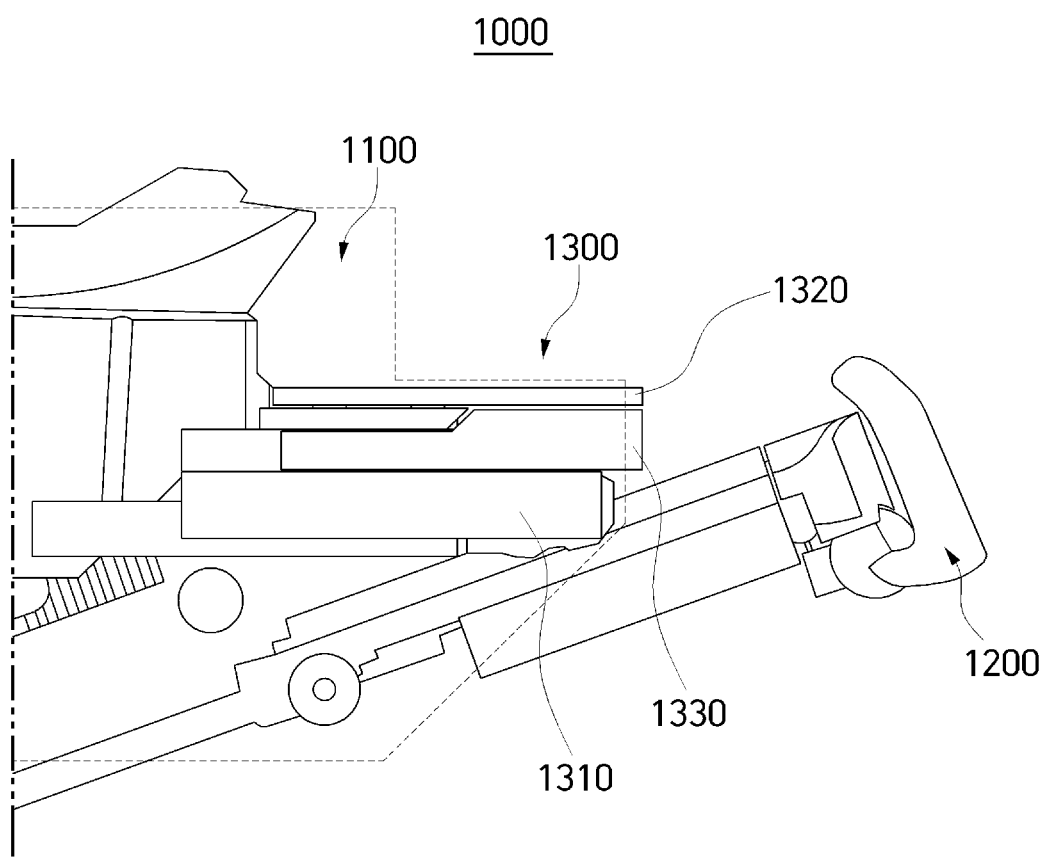
FIG. 2 is a side configuration view illustrating the cockpit module according to one embodiment.
Figure 3:
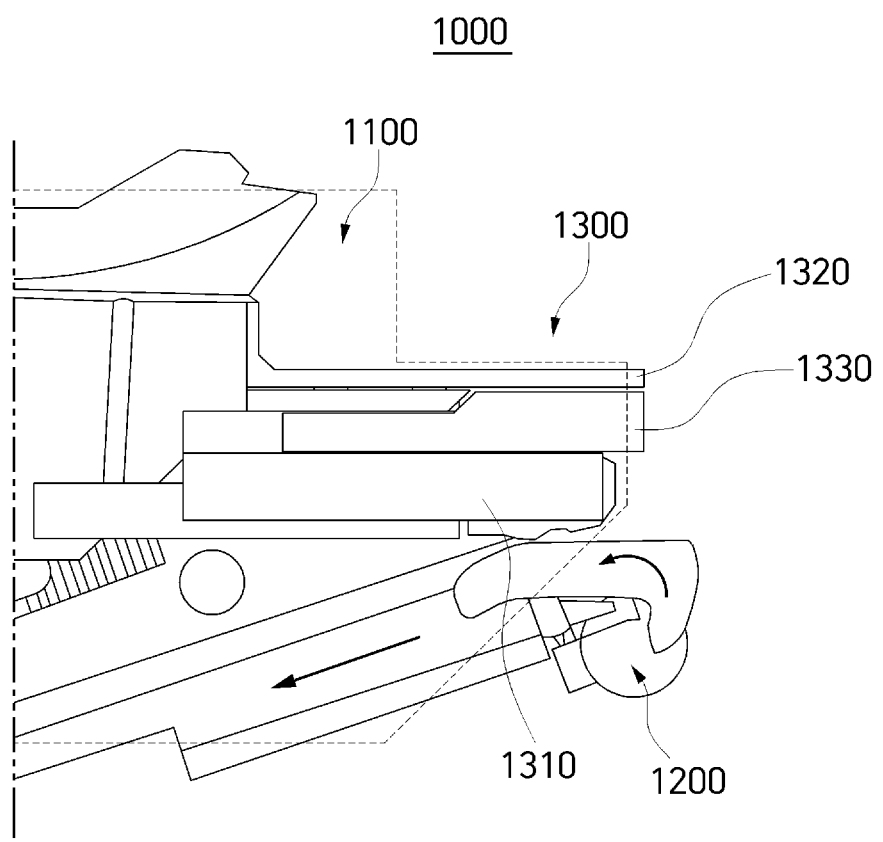
FIGS. 3 and 4 are schematic operational views illustrating a process of withdrawing a table from the cockpit module according to one embodiment.
Figure 4:
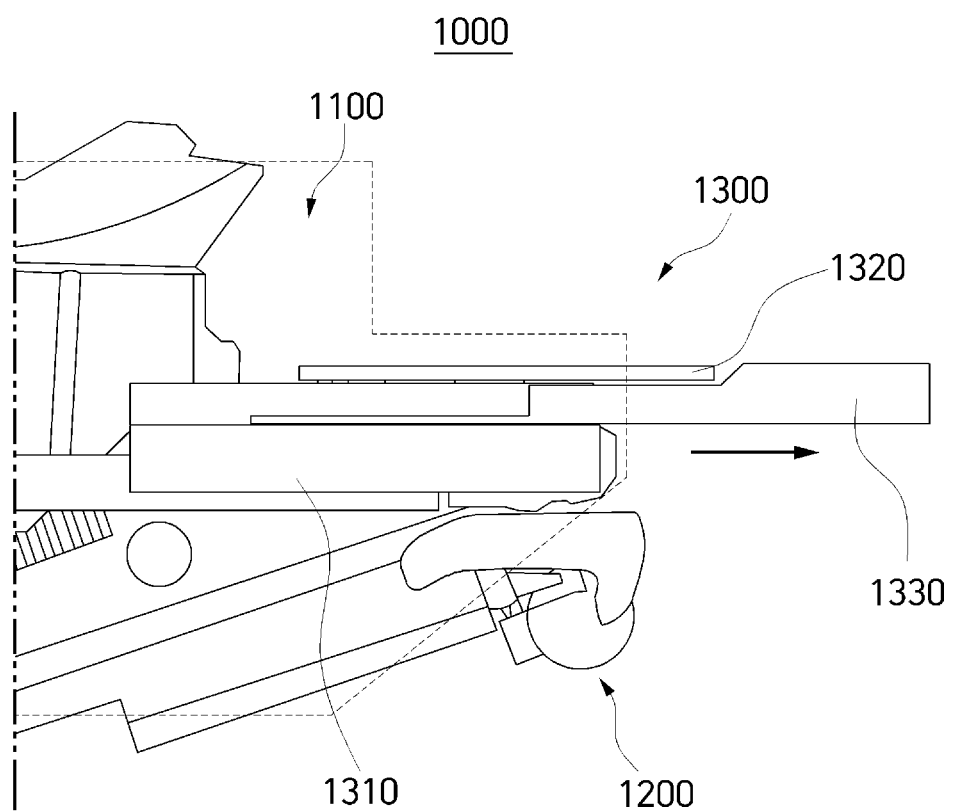
Figure 5:
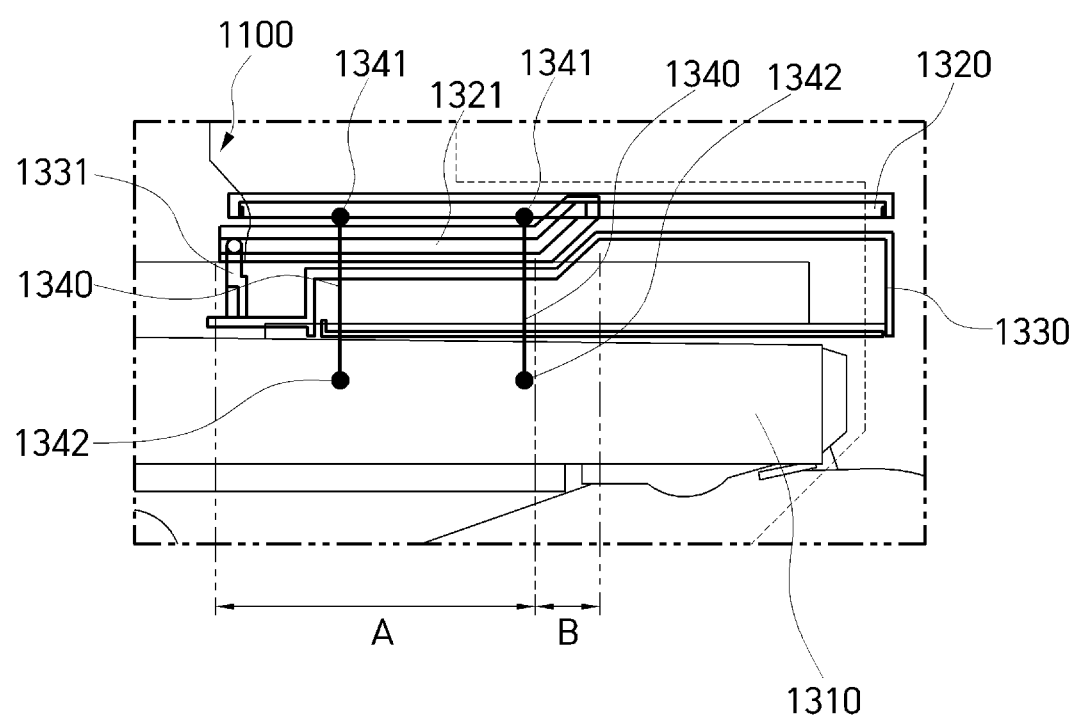
FIGS. 5 to 7 are detailed partial operational views illustrating the process of withdrawing a table from a cockpit module according to one embodiment.

Referring to FIGS. 2 and 3, a cockpit module 1000 mainly includes a crash pad 1100, a steering wheel 1200, and a table 1300.

The crash pad 1100 is a shock mitigating part for minimizing damage to a rider and a vehicle when the vehicle collides. The crash pad 1100 is positioned at the front of the vehicle body.

The steering wheel (stowable column) 1200 is connected into the crash pad 1100 and performs a steering function of the vehicle.

The steering wheel 1200 is selectively buildable in the crash pad 1100.

For example, the steering wheel 1200 is formed in a form in which the steering wheel is inserted into the crash pad 1100. The steering wheel 1200 has a structure of which a rim portion is folded toward the crash pad 1100 (in a forward direction) or unfolded in a rearward direction.

The table 1300 may be used for placing an object thereon according to a purpose or used as a stand for the passenger in the vehicle.

The table 1300 is basically stored in a form of being accommodated in the crash pad 1100 in order to use a space in the vehicle, and extends rearward when used as desired.

The table 1300 may extend when the steering wheel 1200 is accommodated in the crash pad 1100 in advance.

Referring to FIGS. 5 to 10, the table 1300 mainly includes a base plate 1310, an upper tray 1320, and a lower tray 1330.

The base plate 1310 forms a basic bottom surface and is built in the crash pad 1100. Guide pins 1311 and connection brackets 1312 connecting the guide pins 1311 are positioned on a circumference of an upper end surface of the base plate 1310. Pistons 1332 are configured to move on the guide pins 1311.

The guide pins 1311 are connected to a shaft of a separate driving motor and rotate in an axial direction, and the connection brackets 1312 are provided between the plurality of guide pins 1311 and serve to support the guide pins 1311 and change a driving direction of the plurality of guide pins 1311 at the same time.

The upper tray 1320 is positioned above the base plate 1310 and serves as an upper plate. A plurality of rotational links 1340 are disposed between and connected to the base plate 1310 and the upper tray 1320.

An upper hinge shaft 1341 and a lower hinge shaft 1342 are positioned at two ends of each of the rotational links 1340 in a longitudinal direction. The upper hinge shaft 1341 hinge-connects one end portion (upper end portion) of the rotational link 1340 and the upper tray 1320. The lower hinge shaft 1342 hinge-connects the other end portion (lower end portion) of the rotational link 1340 and the base plate 1310.

The upper tray 1320 includes a plurality of guide rails 1321 with the rotational link 1340 interposed therebetween.

The guide rails 1321 are divided into straight sections A and inclined sections B and guide an extension path of the lower tray 1330.

The lower tray 1330 has a structure for being withdrawn from a space between the base plate 1310 and the upper tray 1320 in the rearward direction to extend, or for being inserted between the base plate 1310 and the upper tray 1320 in the forward direction to be accommodated.

The lower tray 1330 has a structure of which an upper end surface is divided into a first straight region, an inclined region, and a second straight region.

Basically, when the lower tray 1330 is accommodated between the base plate 1310 and the upper tray 1320, the first straight region, the inclined region, and the second straight region are all accommodated, and when the lower tray 1330 extends, the corresponding regions are sequentially withdrawn.

Figure 6:
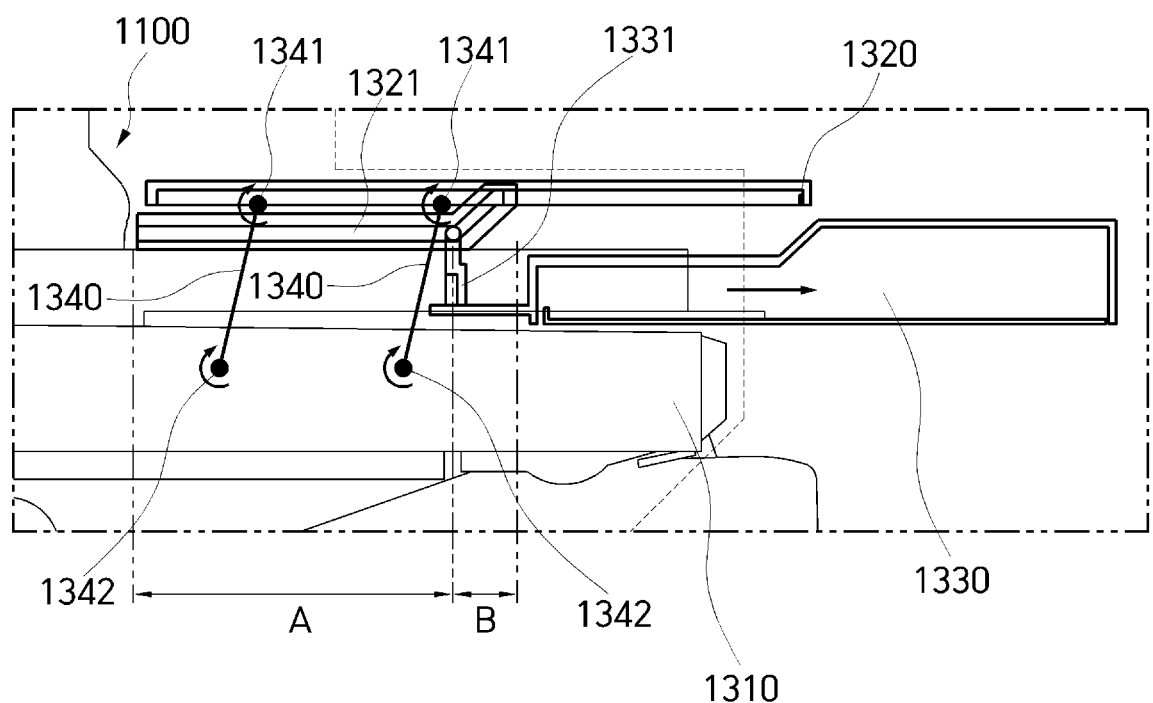
Figure 9:
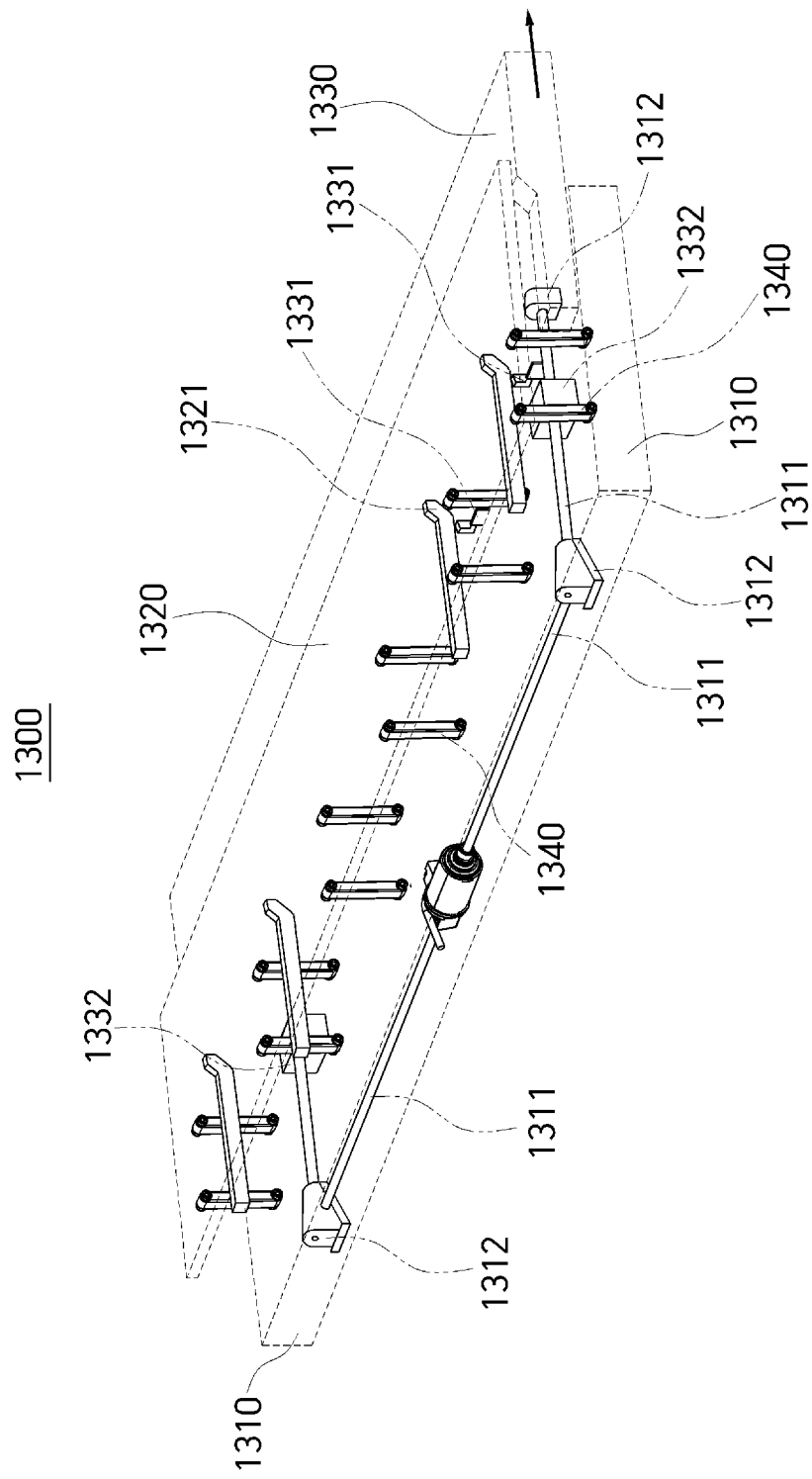

For example, a basic withdrawal mechanism of the lower tray 1330 will be described. As illustrated in FIGS. 6 and 9, the lower tray 1330 moves straight in the rearward direction. As illustrated in FIG. 6, the rotational links 1340 move the upper hinge shafts 1341 rearward using the lower hinge shafts 1342 as support points, and the lower hinge shafts 1342 and the upper hinge shafts 1341 rotate at certain angles.

A guide protrusion 1331 protruding upward from a front end portion of the lower tray 1330 moves rearward on the guide rail 1321 of the upper tray 1320. That is, the guide protrusion 1331 moves from a front start point to a rear end point in a longitudinal direction of the straight section A of the guide rail 1321.

Figure 7:
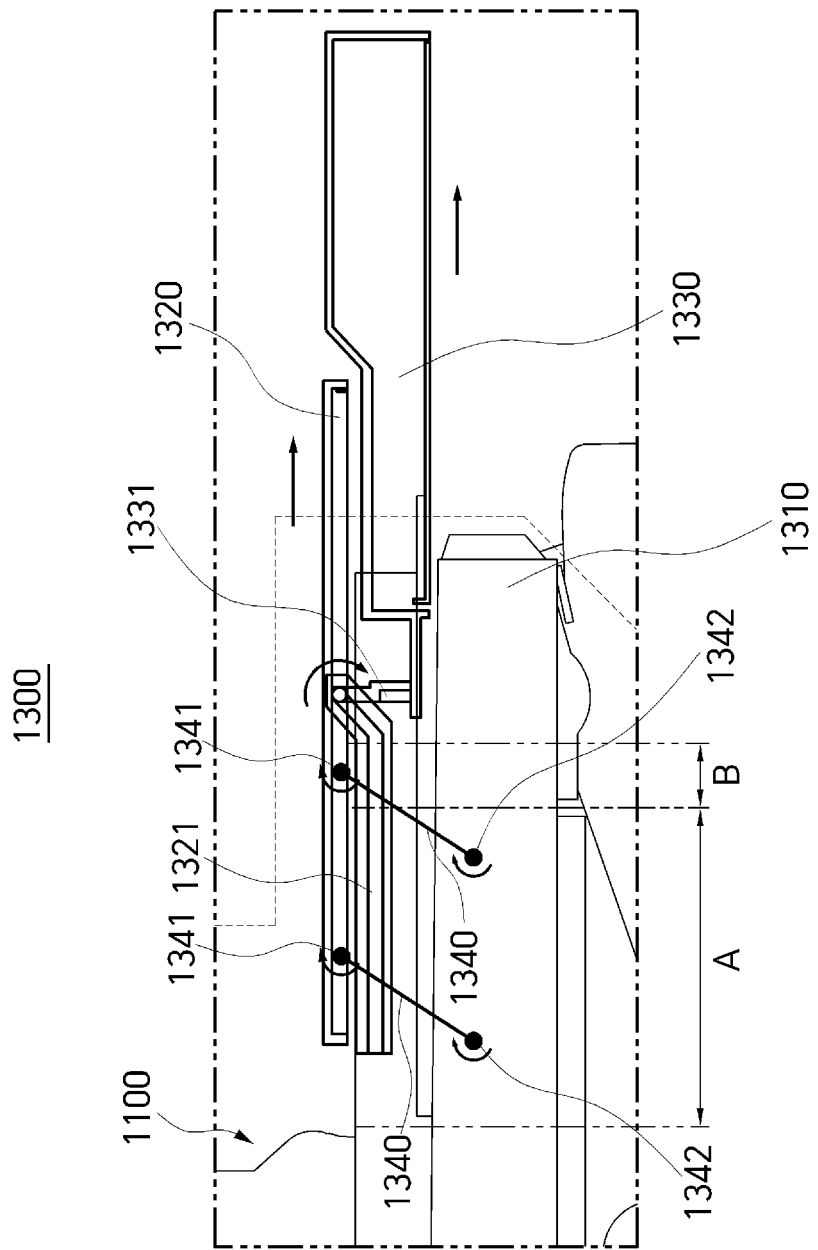
Figure 8:
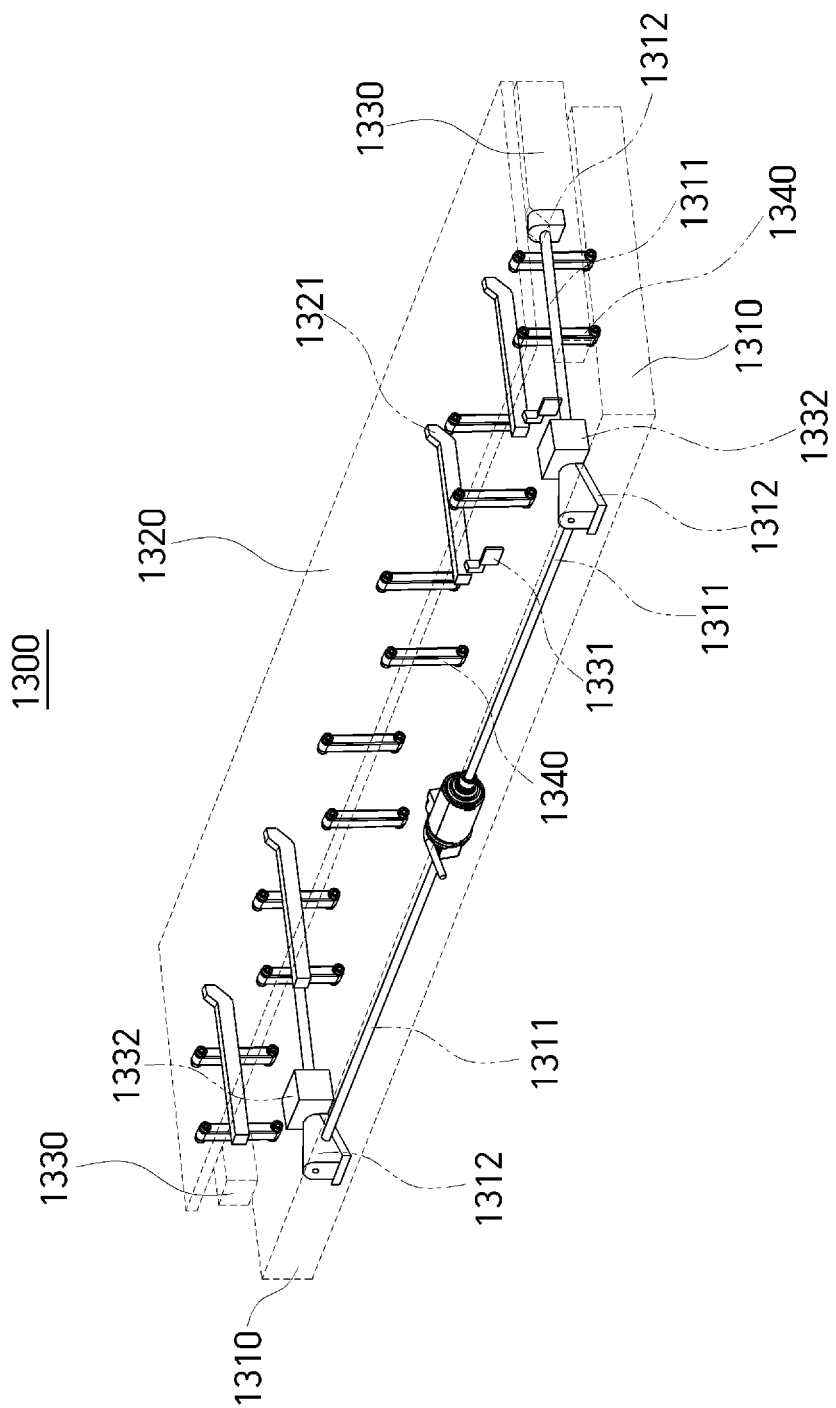
FIGS. 8 to 10 are operational views illustrating the overall process of withdrawing a table from a cockpit module according to one embodiment.
Figure 10:
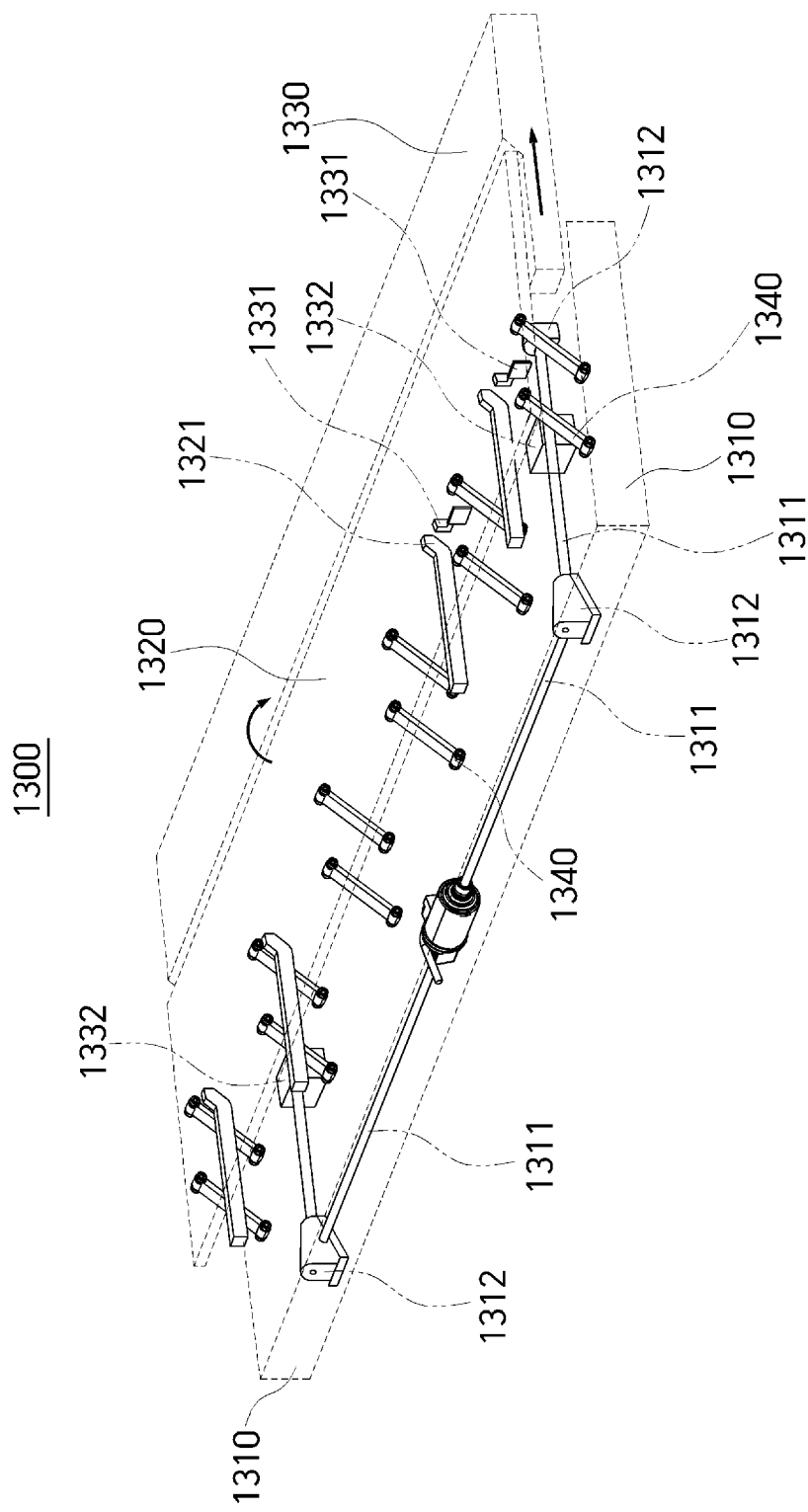

Then, as illustrated in FIGS. 7 and 10, when the lower tray 1330 moves, the guide protrusion 1331 enters the inclined section B of the guide rail 1321, and accordingly, the lower tray 1330 moves rearward and upward.

In this case, since the guide protrusion 1331 is engaged at a rear end point of the straight section A of the guide rail 1321, as the lower tray 1330 moves rearward, the upper tray 1320 also moves rearward along with the lower tray 1330. The rotational link 1340 is inclined rearward with respect to the lower hinge shaft 1342 in conjunction therewith.

Accordingly, since a step between the upper tray 1320 and the lower tray 1330 is removed, a user can use the table 1300 according to a purpose in a comfortable state.

An order of a mechanism in which the lower tray 1330 is inserted and accommodated in the forward direction may be reverse that of the mechanism of the withdrawal.

According to the following description, a cockpit module of a purpose built vehicle can extend a table to provide a larger use space to a passenger.

The subject application has a structural feature that a steering wheel is built in a crash pad so that a space can be efficiently used when the table is withdrawn.

The subject application is not limited to the above-described embodiment and may be variously modified and implemented within a range allowed by the technical spirit of the subject application.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cockpit module of a vehicle, comprising:
   a crash pad;
   a steering wheel positioned in the crash pad; and
   a table, accommodated in the crash pad, comprising an extension structure configured to insert into and withdraw from the crash pad,
   wherein a portion of the table extends from the crash pad in a rearward direction, and wherein the table further comprises:

a base plate;

an upper tray, coupled to the base plate, spaced apart from the base plate; and a lower tray configured to insert into and withdraw from a space between the base plate and the upper tray, the lower tray having an upper end surface which is divided into a first straight region, an inclined region, and a second straight region.

2. The cockpit module of claim 1, further comprising:

a plurality of rotational links disposed between and connected to the base plate and the upper tray, wherein each of the rotational links comprises an upper hinge shaft disposed at one end portion of a corresponding rotational link in a longitudinal direction and connected to the upper tray, and a lower hinge shaft disposed at another end portion of the corresponding rotational link in the longitudinal direction and connected to the base plate.

3. The cockpit module of claim 2, wherein:

the upper tray comprises a plurality of guide rails disposed between the rotational links and engaged with the lower tray; and each of the guide rails comprises a straight section extending from a front end to a rear point of a corresponding guide rail in a longitudinal direction, and an inclined section extending from the straight section to a rear end portion inclined upward.

4. The cockpit module of claim 3, wherein the lower tray comprises a guide protrusion, disposed on a front end portion of the lower tray, engaged with the guide rail, and movable on the guide rail.

5. The cockpit module of claim 1, wherein the base plate comprises a guide pin, engaged with the lower tray, configured to guide an insertion path and a withdrawal path of the lower tray.

6. The cockpit module of claim 5, wherein the lower tray comprises a piston configured to move on the guide pin.

7. The cockpit module of claim 1, wherein the portion of the table extends in the rearward direction from the crash pad when the steering wheel is in the crash pad.

8. The cockpit module of claim 1, wherein the steering wheel is built into the crash pad.

9. A cockpit module of a vehicle, comprising:

a crash pad having different types of accommodation spaces in predetermined sections;

a steering wheel disposed in a type of accommodation space of the accommodation spaces; and a table having an extension structure configured to insert into and withdraw from the crash pad, wherein the table comprises a base plate, an upper tray spaced apart from and disposed above the base plate, a lower tray configured to insert into and withdraw from another type of accommodation space between the base plate and the upper tray, and rotational links disposed between and connected to the base plate and the upper tray.

10. The cockpit module of claim 9, wherein:

the base plate comprises a guide pin, engaged with the lower tray, configured to guide an insertion path and a withdrawal path of the lower tray; and the lower tray comprises a piston configured to move on the guide pin.

11. The cockpit module of claim 9, wherein:

the upper tray comprises a plurality of guide rails positioned between the rotational links and engaged with the lower tray; and each of the guide rails comprises a straight section extending from a front end to a rear point of a corresponding guide rail in a longitudinal direction, and an inclined section extending from the straight section to a rear end portion inclined upward.

12. The cockpit module of claim 11, wherein the lower tray comprises a guide protrusion, disposed on a front end portion of the lower tray, engaged with the guide rail, and movable on the guide rail.

13. The cockpit module of claim 12, wherein the lower tray comprises:

a first straight region on which the upper tray is seated when the lower tray extends;

an inclined region extending from the first straight region and inclined upward; and an upper end surface forming a second straight region extending from the inclined region along a straight path.

* * * * *